(12) United States Patent
Sun et al.

(10) Patent No.: US 7,538,971 B2
(45) Date of Patent: May 26, 2009

(54) MICROACTUATOR CONTROL ADJUSTMENT USING TEMPERATURE SENSOR MEASUREMENTS

(75) Inventors: Yu Sun, Fremont, CA (US); Xiaoping Hu, Milipitas, CA (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 11/789,500

(22) Filed: Apr. 25, 2007

(65) Prior Publication Data

US 2007/0253097 A1 Nov. 1, 2007

Related U.S. Application Data

(60) Provisional application No. 60/745,718, filed on Apr. 26, 2006.

(51) Int. Cl.
*G11B 5/596* (2006.01)
(52) U.S. Cl. .............. 360/78.04; 360/78.06; 360/77.02; 360/78.07
(58) Field of Classification Search ........................ None
See application file for complete search history.

(56) References Cited

U.S. PATENT DOCUMENTS

| | | | |
|---|---|---|---|
| 4,581,567 A * | 4/1986 | Yanagawa et al. ............ 318/696 |
| 6,160,676 A * | 12/2000 | Takaishi ................... 360/78.05 |
| 6,188,191 B1 * | 2/2001 | Frees et al. .................. 318/560 |
| 6,342,985 B1 * | 1/2002 | Clare et al. .................... 360/75 |
| 6,504,670 B1 | 1/2003 | Dittmar |
| 6,975,123 B1 | 12/2005 | Malang et al. |
| 6,975,477 B1 | 12/2005 | Hu et al. |
| 6,985,327 B2 | 1/2006 | Szita |
| 7,012,780 B1 | 3/2006 | Hu et al. |
| 7,031,099 B2 | 4/2006 | Kohso et al. |
| 7,038,888 B2 | 5/2006 | Ma |
| 7,126,785 B1 | 10/2006 | Li et al. |
| 7,145,745 B1 | 12/2006 | Shepherd et al. |
| 7,283,321 B1 * | 10/2007 | Sun et al. .................. 360/78.05 |
| 2002/0118485 A1 * | 8/2002 | Tokuyama et al. ........ 360/78.05 |
| 2002/0176201 A1 | 11/2002 | Hsin et al. |
| 2004/0228027 A1 * | 11/2004 | Zhang et al. ............. 360/78.05 |

OTHER PUBLICATIONS

Masahito Kobayashi and Roberto Horowitz "Track Seek Control for Hard Disk Dual-Stage Servo Systems", vol. 37, No. 2, Mar. 2001, pp. 949-954.

Y. Mizoshita, S. Hasegawa, and K. Takaishi "Vibration Minimized Access Control for Disk Drives", vol. 32, No. 3 May 1996, pp. 1793-1798.

Neil C. Singer, Lucy Y. Pao, William E. Singhose and Warren P. Seering "An Efficient Algorithm For The Generation of Multiple-Mode Input Shaping Sequences", Proceedings of the 1996 IEEE International Conference on Control Applications, Dearborn, MI; Sep. 15-18, 1996, pp. 373-378.

Masayoshi Tomizuka "Zero Phase Error Tracking Algorithm for Digital Control", Journal of Dynamic Systems, Measurement, and Control, Mar. 1987, vol. 109/65-109/68.

* cited by examiner

*Primary Examiner*—Andrew L Sniezek
(74) *Attorney, Agent, or Firm*—Myers Bigel Sibley & Sajovec, P.A.

(57) ABSTRACT

Embodiments of the present invention allow for controlling a microactuator based at least in part on an output of a temperature sensor. Also, embodiments of the present invention allow for adjusting a control of a microactuator so as to compensate for changes in a gain of the microactuator due to changes in temperature.

18 Claims, 9 Drawing Sheets

MICROACTUATOR CONTROL ADJUSTMENT USING TEMPERATURE SENSOR MEASUREMENTS

CROSS-REFERENCE TO RELATED PATENT APPLICATIONS

Embodiments of the present invention relate to U.S. Provisional Application Ser. No. 60/745,718, filed Apr. 26, 2006, entitled "Adjusting Microactuator Gain Based on Temperature Sensor Measurement", the contents of which are incorporated by reference herein and which is a basis for a claim of priority.

BACKGROUND

Embodiments of the present invention relate generally to microactuator control and, more particularly, to active control of a microactuator.

Disk drives are widely used in computers and other electronic devices for the storage and retrieval of data. Disk drive manufacturers are constantly working to try to increase the performance of disk drives by increasing a data transfer rate of the disk drives. Two main ways to increase the data transfer rate of disk drives are to: (i) lower a seek time, which is a time required to position a head for a read or a write operation; and (ii) improve an accuracy of track following operations, which maintain a head on a track for a read or a write operation. Thus, disk drive manufacturers are very interested in new ways of reducing seek time and improving the accuracy of track following operations.

In general, related art disk drives comprise one or more disks for storing data, a coarse actuator, a microactuator, an actuator arm assembly, one or more transducers or heads, and a servo controller. Each head is operable to read data from and to write data to one or more tracks on a surface of a corresponding disk. The actuator arm assembly includes a first member connected to a base of the disk drive and a second member on which the heads are mounted. The microactuator interconnects the first member and the second member of the actuator arm assembly to provide for fine positioning of the heads. The coarse actuator controls the actuator arm assembly to move the microactuator relative to the disk and, as a consequence, provides coarse positioning of the heads.

Servo controllers of disk drives typically perform the functions of seek control and track following. To perform seek control, servo controllers generally provide for a single-stage seek trajectory in which the servo controller controls the coarse actuator to move the actuator arm assembly and, as a result, position a head over a desired track of the disk for a read or a write operation. Such a servo controller may be configured to control the movement of the coarse actuator based on a coarse actuator control loop. As part of the coarse actuator control loop, the servo controller determines a position error signal during the positioning of the head by reading servo data stored in servo sectors on the disk. The servo controller then controls the movement of the coarse actuator based on the position error signal.

In the past, the microactuator has generally not been used for seek operations. Instead, the microactuator has typically been used for track following. Servo controllers generally perform track following once a head has been positioned over a desired track after a seek operation. Such servo controllers may control the microactuator to finely position the head with respect to the desired track based on a position error signal, so that an accuracy of track following can be increased. The range of movement of the microactuator is generally much less than the range of movement of the coarse actuator, and microactuators typically have a maximum range of movement of about a few tracks in either direction. In contrast, most coarse actuators have a range of movement that allows for movement of a head across all tracks on a disk.

However, the microactuator of related art disk drives generally provides for much faster positioning of the head than is provided for by the coarse actuator. Such a difference in positioning speed is realized because the microactuator typically comprises a piezoelectric (PZT) device, or the like, that moves immediately when a current is applied, whereas the coarse actuator is typically a voice coil motor (VCM) that does not move the actuator arm assembly immediately when a current is applied due to some inertia.

Recently, there has been an effort to take advantage of the rapid movement of the microactuator to reduce seek time during short seeks that seek the head over a small number of tracks. Instead of only using the coarse actuator to perform a seek operation, it has been proposed to use both the coarse actuator and the microactuator during seek operations by having a dual stage seek trajectory, including both a stepping stage and a retracting stage. Such a dual stage seek trajectory takes advantage of the ability of the microactuator to move the head rapidly within a certain range that can cover a small number of tracks.

During the stepping stage of a dual stage seek trajectory, the microactuator moves the head to a target track on the disk very quickly. Then, once the head is over the target track, the retracting stage begins in which the microactuator moves in the opposite direction of the coarse actuator so as to keep the head over the target track while the coarse actuator moves the microactuator toward the target track. In the best case, the head may be declared on-track at the end of the stepping stage when the head reaches the target track, while both the coarse actuator and the microactuator are still moving.

The microactuator must be controlled very precisely to reduce post seek track-misregistration (TMR) when a dual stage seek trajectory is employed. Precise control of the microactuator is also important for track following operations. In order to control the microactuator, some related art disk drives have a microactuator control loop, which allows for a movement of the microactuator to be controlled in accordance with a control signal, and where a position error signal is used as feedback for the microactuator control loop. A control portion of the microactuator control loop is generally designed by assuming a certain gain for the microactuator and then setting control values for generating the control signal based on the assumption of the certain gain, where the control values remain constant during disk drive operation.

However, in reality, a gain of the microactuator may change during operation due to, for example, environmental conditions, so the microactuator will not move as precisely as expected based on such a control signal. The control of the microactuator in such related art systems will not be as precise as expected when the gain of the microactuator changes from an assumed gain that is used to set the control values to a different gain due to, for example, a change in ambient temperature. Thus, in the related art disk drives, there is still an undesirable amount of seek TMR associated with dual stage seek operations that inhibits on-track from being declared sooner. As a result, seek time is increased due to the undesirable seek TMR and the data transfer rate of the disk drives is reduced.

In light of the above-mentioned problems, there is a need for systems and methods that allow for improved control of microactuators during track following operations and during short seek operations with dual stage seek trajectories, so as to compensate for position errors due to changes in microactuator gains caused by changes in temperature, and the like.

SUMMARY

Embodiments of the present invention allow for controlling a microactuator based at least in part on an output of a temperature sensor. Also, embodiments of the present invention allow for adjusting a control of a microactuator so as to compensate for changes in a gain of the microactuator due to changes in temperature.

A circuit in accordance with an embodiment of the present invention includes a controller for providing a signal to a microactuator. The controller is configured to vary the signal based at least in part on an output of a temperature sensor.

A system in accordance with an embodiment of the present invention includes a microactuator, a temperature sensor, and a controller. The controller allows for controlling the microactuator based at least in part on an output of the temperature sensor.

A method in accordance with an embodiment of the present invention includes controlling a microactuator based at least in part on an output of a temperature sensor. In some embodiments, a method includes determining a relationship between changes in temperature and changes in a gain of a microactuator, and compensating for changes in the gain of the microactuator using the determined relationship.

DETAILED DESCRIPTION OF PREFERRED EMBODIMENTS

Figure 1:
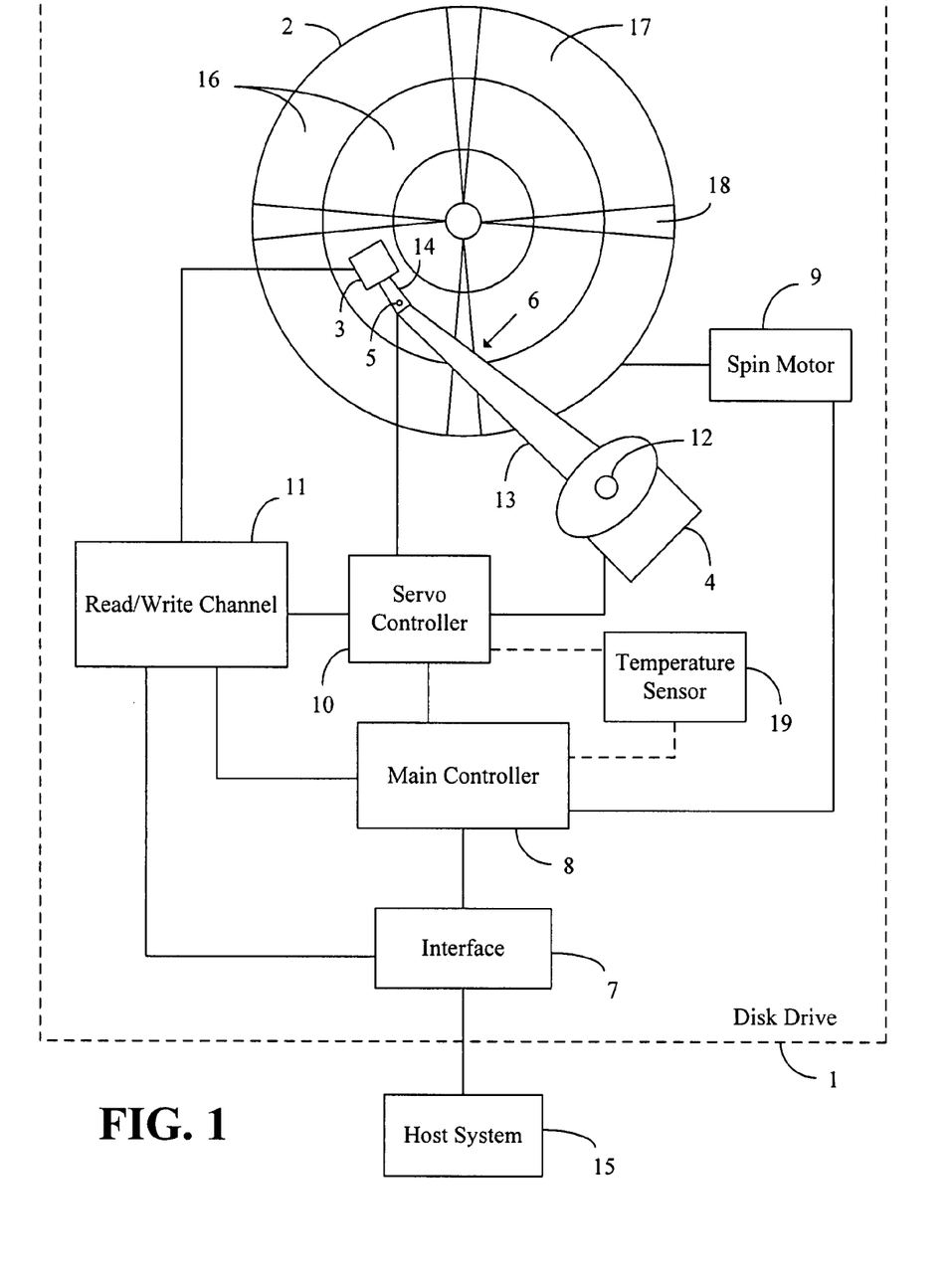
FIG. 1 illustrates a functional block diagram of a disk drive of an embodiment of the present invention in communication with a host system.

FIG. 1 illustrates a functional block diagram of a disk drive 1 of an embodiment of the present invention in communication with a host system 15. The disk drive 1 comprises a disk 2, a transducer or head 3, a coarse actuator 4, a microactuator 5, an actuator arm assembly 6, an interface 7, a main controller 8, a spin motor 9, a servo controller 10, a read/write (r/w) channel 11, and a temperature sensor 19. The head 3 is mounted on one end of the actuator arm assembly 6, and another end of the actuator arm assembly 6 is connected to a base (not shown) of the disk drive 1 by a bearing 12.

The actuator arm assembly 6 comprises a first member 13 and a second member 14 that are interconnected by the microactuator 5. During operation, the disk 2 spins around a central axis, and the head 3 reads data from or writes data to a surface of the disk 2. The coarse actuator 4 rotates the actuator arm assembly 6 about the bearing 12 in order to control a position of the microactuator 5 and the head 3 over the disk 2. The microactuator 5 moves the second member 14 of the actuator arm assembly 6 to position the head 3 over the disk 2.

The coarse actuator 4 may comprise a motor, such as a voice coil motor (VCM), or the like, and may provide for coarse positioning of the head 3 over the disk 2. The microactuator 5 may comprise, for example, a piezoelectric (PZT) device, or the like. The microactuator 5 may provide for fine positioning of the head 3 over the disk 2. A range of movement of the microactuator 5 may be small, such as moving the head 3 across a few tracks, while a range of movement of the coarse actuator 4 may be large, such as moving the head 3 across all tracks on the disk 2.

The disk drive 1 is not limited to having only a single disk 2, but may have a plurality of disks. Also, data may be written to both a top surface and a bottom surface of each disk, in which case a different head is required for each surface. The head 3 may have a single element for performing both reading and writing, or the head 3 may have separate elements for performing each of those operations, in which case the head 3 would comprise a read element and a write element.

In various embodiments, the temperature sensor 19 may be any type of temperature sensor that provides an output signal indicative of a temperature. In some embodiments, an output of the temperature sensor 19 is provided to the servo controller 10. Also, in some embodiments, an output of the temperature sensor 19 is provided to the main controller 8, and the main controller 8 provides the received temperature sensor output to the servo controller 10. In various embodiments, the output of the temperature sensor 19 is used for flying height adjustment control of the head 3.

In the following discussion, the disk drive 1 is described with reference to functional blocks and not discrete hardware elements. The functions may be implemented using one or more of hardware, software, and firmware. In addition, more than one function, or different parts of functions, may be combined in a given hardware, software, or firmware implementation.

When the disk drive 1 is connected to the host system 15, the interface 7 communicates with the host system 15 to receive, for example, data and commands, and to send, for example, data and status identifiers. The interface 7 also communicates with the main controller 8 and the r/w channel 11 to send and receive, for example, data and commands. When the main controller 8 receives a command from the interface 7 for a read or a write operation, the main controller 8 provides a signal to the spin motor 9 to cause the disk 2 to spin.

As shown in FIG. 1, the disk 2 has a plurality of tracks 16 for storing data. Each of the tracks 16 has a plurality of data sectors 17 and a plurality of embedded servo sectors 18. During operation of the disk drive 1, a data block may be read from or written to a data sector of the plurality of data sectors 17. The plurality of embedded servo sectors 18 are written with servo patterns or data that are used for determining a position of the head 3 with respect to a track of the plurality of tracks 16.

When performing a read or a write operation, the main controller 8 sends a signal that contains information about a selected track to the servo controller 10. The servo controller 10 then performs a seek operation to position the head 3 over the selected track. The seek operation may be a short seek operation, in which the head 3 is moved across a number of tracks that are within the range of movement of the microactuator 5, or a long seek operation, in which the head 3 is moved across a number of tracks that is outside of the range of movement of the microactuator 5. Ideally, the head 3 is positioned directly over a center of the selected track during the seek operation.

However, in reality, when the head 3 is positioned over the selected track, there will be some amount of seek settle track-misregistration (TMR), which represents a misalignment of the head 3 from the center of the selected track during seek settle when the head 3 is settling over the selected track. The seek settle TMR may be due to, for example, the head 3 overshooting the center of the selected track and having to be repositioned toward the center of the selected track. The head 3 may have particular tolerances to perform operations even when there is some TMR, so the servo controller 10 may wait for the head 3 to settle over the selected track, and may declare that the head 3 is on-track once the TMR is within a tolerance of the head 3 for an operation.

When the servo controller 10 determines that the head 3 is on-track, the servo controller 10 sends a signal to the r/w channel 111 to allow for the start of a read or a write operation. It is also possible that the servo controller 10 sends the signal to the main controller 8 rather than to the r/w channel 11, in which case the main controller 8 would then send the signal to the r/w channel 11. The r/w channel 11 also receives a command from the main controller 8 that specifies the type of operation to be performed. In the case of a read operation, the r/w channel 11 causes the head 3 to read the data and then sends the data to either the interface 7 or the main controller 8. In the case of a write operation, the r/w channel 11 receives data from either the interface 7 or the main controller 8 and causes the head 3 to write the data.

The performance of short seek operations by the disk drive 1 will now be discussed. The servo controller 10 may be configured to determine whether a seek operation can be performed as a short seek operation with a dual stage trajectory by determining whether a seek distance from a current track at which the head 3 is positioned to a target track of a seek operation is within a range of movement (i.e. within a stroke limit) of the microactuator 5. The servo controller 10 may be configured to perform a short seek operation with a dual stage seek trajectory in the case that the servo controller 10 determines that the seek distance is within the range of movement of the microactuator 5. The main controller 8 may be configured to determine the seek distance rather than the servo controller 10, in which case the main controller 8 may be configured to instruct the servo controller 10 to perform the short seek operation with a dual stage seek trajectory if the seek distance is within the range of movement of the microactuator 5.

The servo controller 10 may be configured to perform a short seek operation with a dual stage seek trajectory in order to reduce seek time. A dual stage seek trajectory is designed to have two stages, a stepping stage and a retracting stage, according to the moving direction of the microactuator 5. During the stepping stage, the servo controller 10 may control the microactuator 5 to move the head 3 to the target track as quickly as possible. Once the head 3 reaches the target track, the servo controller 10 may begin the retracting stage in which the servo controller 10 may control the microactuator 5 to move in the opposite direction of the coarse actuator 4 to keep the head 3 over the target track while the servo controller 10 controls the coarse actuator 4 to move the microactuator 5 toward the target track. In the best case, the servo controller 10 declares that the head 3 is on-track at the end of the stepping stage when the head 3 reaches the target track, while both the coarse actuator 4 and the microactuator 5 are still moving.

Figure 2A:
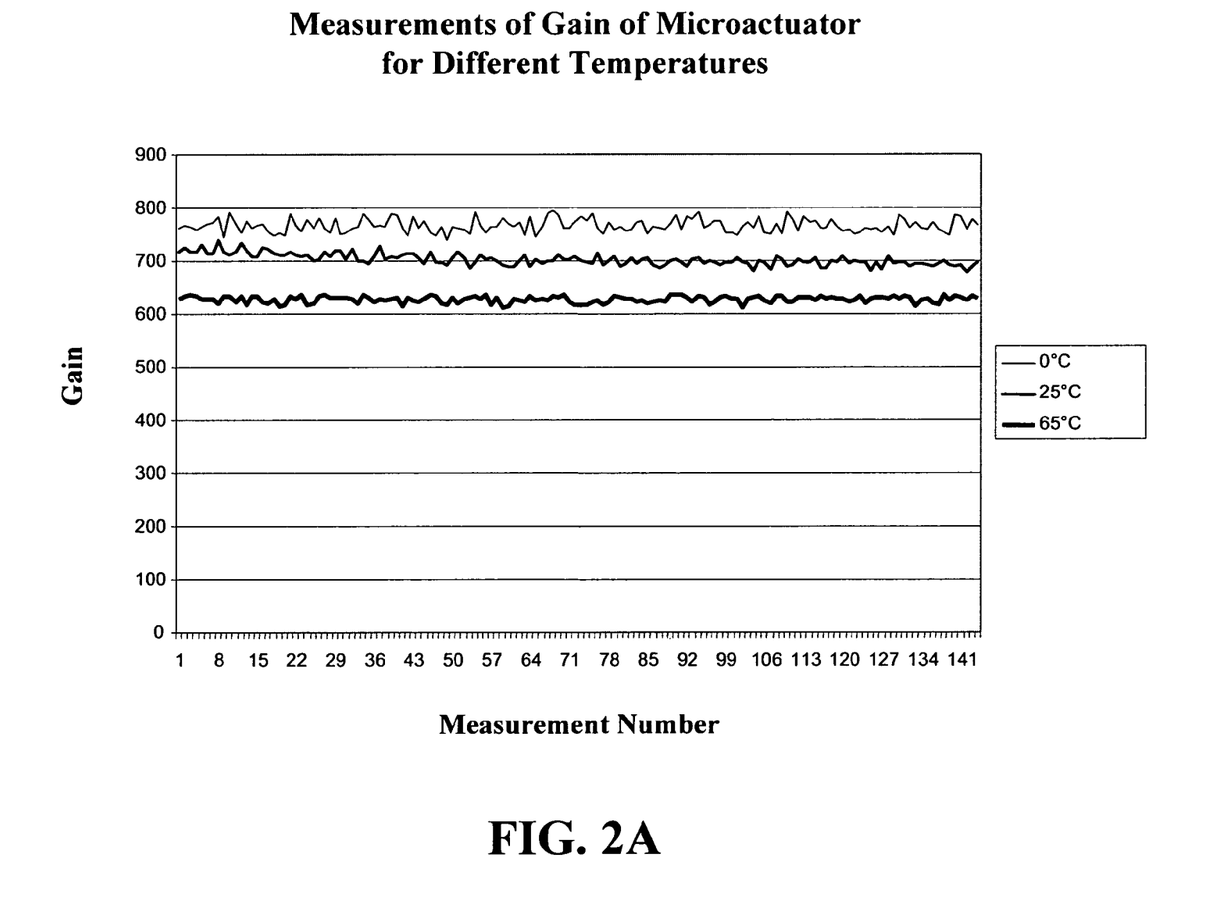
FIG. 2A illustrates measurements of a gain of a sample microactuator for different temperatures.

FIG. 2A illustrates measurements of a gain of a sample microactuator for different temperatures, where the sample microactuator comprises a piezoelectric device. In FIG. 2A, the vertical axis provides a measured gain of the sample microactuator, and the horizontal axis provides a measurement number. To form the chart of FIG. 2A, the gain of the sample microactuator was measured a plurality of times with an ambient temperature of 0° C., a plurality of times with an ambient temperature of 25° C., and a plurality of times with an ambient temperature of 65° C. As is illustrated by the chart of FIG. 2A, the gain of the sample microactuator decreases with increasing temperature.

Figure 2B:
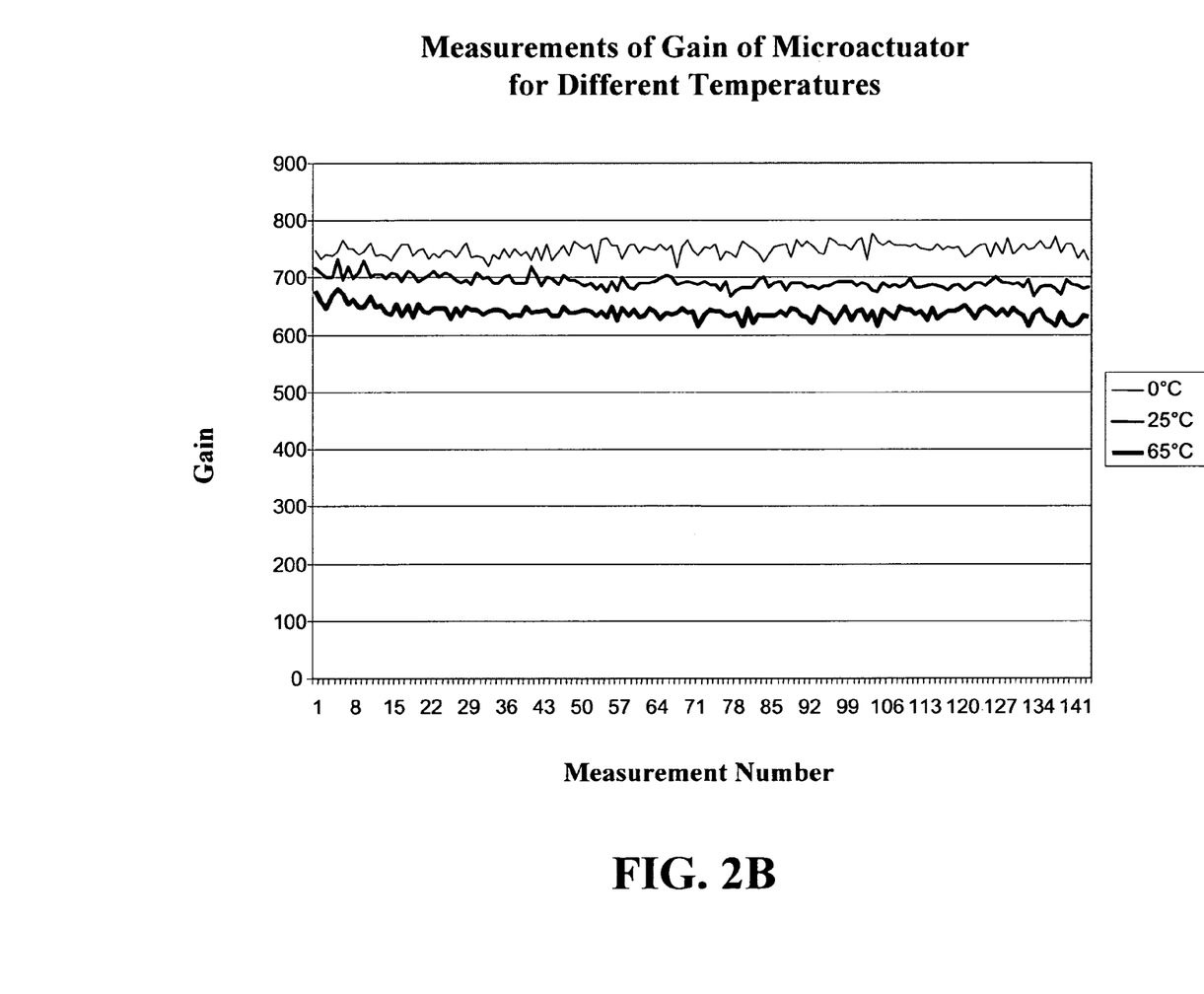
FIG. 2B illustrates measurements of a gain of another particular sample microactuator for different temperatures.

FIG. 2B illustrates measurements of a gain of another particular sample microactuator for different temperatures, where the particular sample microactuator comprises a piezoelectric device. In FIG. 2B, the vertical axis provides a measured gain of the particular sample microactuator, and the horizontal axis provides a measurement number. To form the chart of FIG. 2B, the gain of the particular sample microactuator was measured a plurality of times with an ambient temperature of 0° C., a plurality of times with an ambient temperature of 25° C., and a plurality of times with an ambient temperature of 65° C. As is illustrated by the chart of FIG. 2B, the gain of the particular sample microactuator decreases with increasing temperature. Also, as is illustrated by the differences between FIG. 2A and FIG. 2B, different types of microactuators may have different changes in gain for temperature changes.

Accurate piezoelectric gain calibration is crucial for disk drive performance to allow for consistent microactuator bandwidth and is crucial for disk drive reliability to allow for a consistent margin and for accurate screening of disk drives during self-tests. However, as is illustrated in FIGS. 2A and 2B, a piezoelectric gain of a microactuator varies due to in-drive temperature variations. If a servo control system for controlling a microactuator is developed using an assumed gain for the microactuator, then the servo control system might not provide as accurate of control as desired during disk drive operation due to variations of the actual physical gain of the microactuator caused by changes in temperature. For microactuators that comprise piezoelectric material, the piezoelectric material has thermal sensitivity that leads to changes in gain with changes in temperature. In some disk drives, for example, there may be as much as a 20% change in a gain of a microactuator when a temperature changes from 0° C. to 65° C.

A method in accordance with an embodiment of the present invention allows for determining a relationship, such as an equation, or the like, between temperature and microactuator gain based on measurements from one or more sample disk drives. Such an equation may be in any form. In some embodiments, a first order polynomial equation may be adequate to describe a relationship between temperature and microactuator gain.

Figure 3:
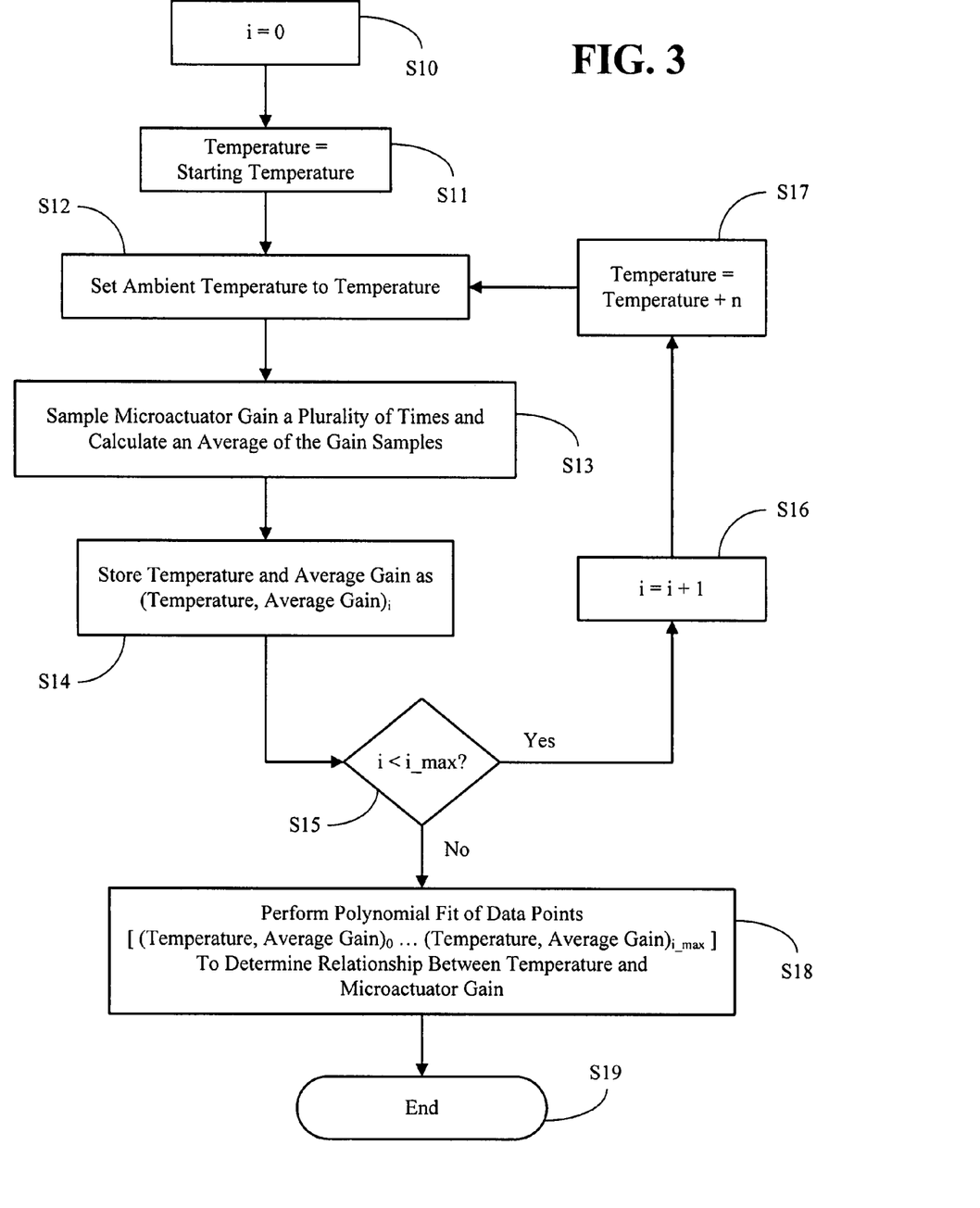
FIG. 3 illustrates a flowchart of a method in accordance with an embodiment of the present invention for determining a relationship between temperature and a gain of a microactuator.

FIG. 3 illustrates a flowchart of a method in accordance with an embodiment of the present invention for determining a relationship between temperature and a gain of a microactuator in a disk drive. In S10, a variable i is set to 0, and the method continues to S11. In S11, a variable for temperature is set to a starting temperature, such as 0° C., and the method continues to S12. In S12, an ambient temperature around the disk drive is set to the temperature specified by the variable for temperature, and the method continues to S13.

In S13, a gain of the microactuator is sampled a plurality of times, and an average of the microactuator gain samples is calculated, and then the method continues to S14. In S14, the temperature and average gain are stored as a data point (Temperature, Average Gain)$_i$, and the method continues to S15. In S15, it is determined whether or not is less than i_max, where i_max is a variable that is set to control a number of data points of temperature and average gain that are collected. If it is determined in S115 that i is less than i_max, then the method continues to S16. In S16, i is incremented by one, and the method continues to S17. In S17, the temperature variable is incremented by n, where n is a variable that is set to control a stepping value for the temperature in the method, and then the method returns to S12.

On the other hand, if it is determined in S15 that i is not less than i_max, then the method continues to S18. In S18, a polynomial fit is performed using the data points (Temperature, Average Gain)$_k$, where 0<=k<=i_max, to determine a relationship between temperature and microactuator gain. In some embodiments, the polynomial fit is a first-order polynomial fit of the data points. In various other embodiments, the polynomial fit may be a second or higher order polynomial fit. Once the relationship between temperature and microactuator gain has been determined in S118, the method ends in S19. Such a relationship between temperature and microactuator gain as is determined in the method of FIG. 3 may be used for microactuator control adjustment during disk drive operation.

Figure 4:
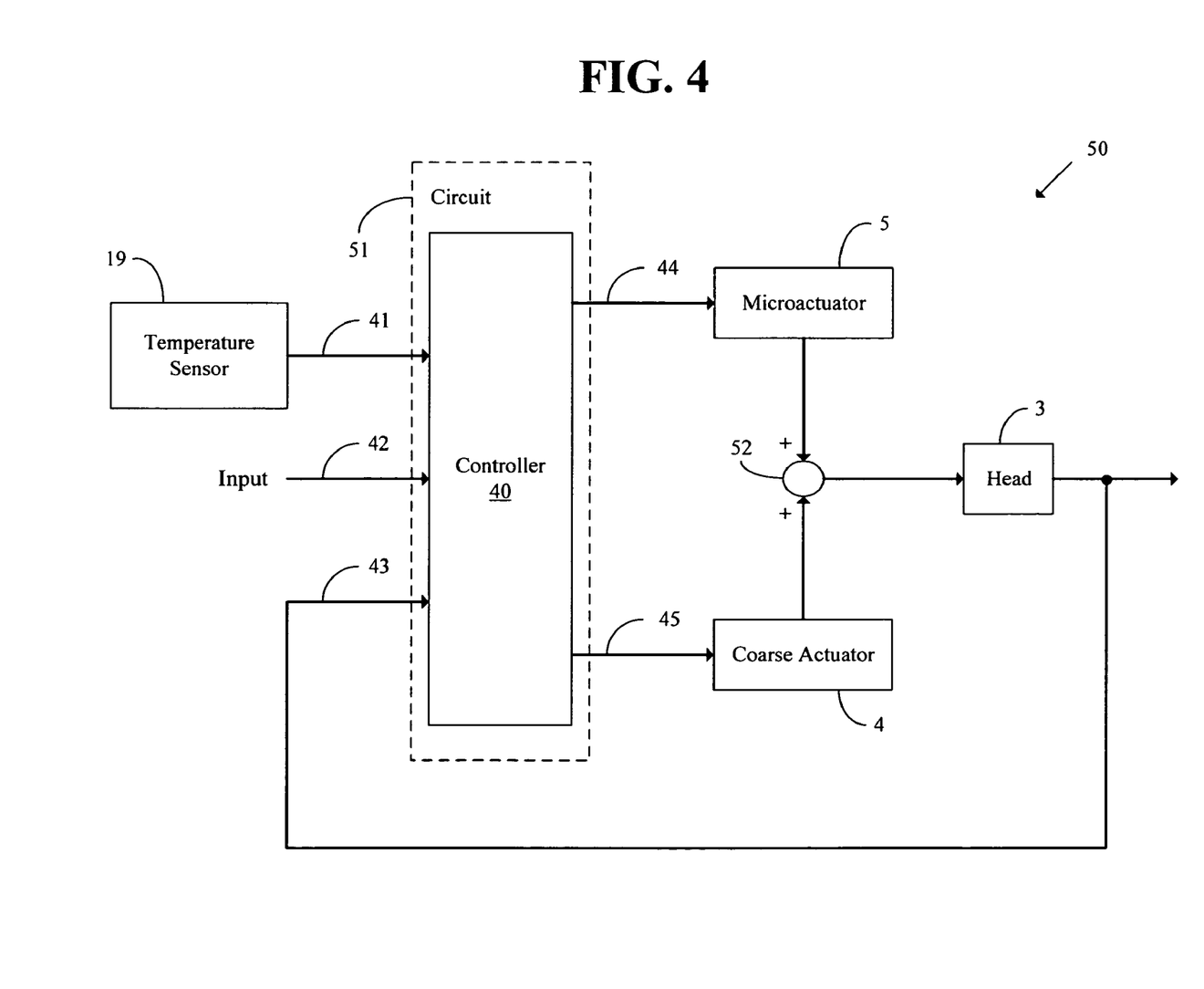
FIG. 4 illustrates a system in accordance with an embodiment of the present invention.

FIG. 4 illustrates a system 50 in accordance with an embodiment of the present invention. The system 50 includes a circuit 51, the temperature sensor 19, the head 3, the coarse actuator 4, and the microactuator 5. The circuit 51 includes a controller 40. In various embodiments, the circuit 51 is at least part of a servo controller, such as the servo controller 10 (refer to FIG. 1). The controller 40 allows for controlling the microactuator 5 based at least in part on an output of the temperature sensor 19. In various embodiments, the microactuator 5 comprises a piezoelectric device, or the like.

In some embodiments, the controller 40 receives an input 42 that may specify, for example, a desired target track to which the head 3 should be positioned or should follow, a number of tracks over which a seek is to be performed, or the like. In various embodiments, the controller 40 receives the input 42 from a main controller, such as the main controller 8 (refer to FIG. 1). The controller 40 also receives an output 41 of the temperature sensor 19. In some embodiments, the controller 40 receives the output 41 of the temperature sensor 19 directly from the temperature sensor 19, while in various other embodiments, the controller 40 may receive the output 41 of the temperature sensor 19 or another signal indicative of the output 41 of the temperature sensor 19 from another source, such as the main controller 8 (refer to FIG. 1).

The controller 40 is configured to provide a signal 44 to the microactuator 5 to control a movement of the microactuator 5. In various embodiments, the controller 40 is also configured to provide a signal 45 to the coarse actuator 4 to control a movement of the coarse actuator 4. The summing node 52 illustrates that a movement of the head 3 is a combination of the movement of the head 3 due to the output of the microactuator 5 and the movement of the head 3 due to the output of the coarse actuator 4.

With reference to FIGS. 1 and 4, during a seek operation and track following, the head 3 reads data from servo sectors of the plurality of servo sectors 18 on the disk 2, and the head 3 provides a signal based on the read data to the r/w channel 11. The r/w channel 11 processes the signal from the head 3 when the head 3 reads data from the servo sectors, and the r/w channel 11 provides servo information to the servo controller 10 by processing the signal from the head 3. The servo controller 10 uses the servo information as a sensed position signal that indicates a position of the head 3 with respect to a track of the one or more tracks 16. In the controller 40, the sensed position signal is used as a feedback signal 43.

In various embodiments, the controller 40 provides the signal 44 to control the microactuator 5 based at least in part on the input 42 specifying a desired track and the feedback signal 43 specifying a sensed position of the head 3. Because a gain of the microactuator 5 changes with changes in temperature, the controller 40 also varies the signal 44 provided to the microactuator 5 based at least in part on the output 41 of the temperature sensor 19. By varying the signal 44 provided to the microactuator 5 based at least in part on the output 41 of the temperature sensor 19, the controller 40 is able to compensate for changes in the gain of the microactuator 5 due to changes in temperature and, thus, to improve an accuracy of movement of the microactuator 5.

In various embodiments, the microactuator 5 is controlled based at least in part on a level of the signal 44 output from the controller 40, and the controller 40 is configured to control the level of the signal 44 based at least in part on the output 41 of the temperature sensor 19. In some embodiments, the controller 40 is configured to periodically monitor the output 41 of the temperature sensor 19 to obtain a plurality of temperature sensor measurements, and the controller 40 is configured to vary the signal 44 provided to the microactuator 5 based at least in part on one or more of the plurality of temperature sensor measurements.

In various embodiments, the controller 40 is configured to control the level of the signal 44 provided to the microactuator 5 based at least in part on an estimate of a gain of the microactuator 5, and the controller 40 is configured to adjust the estimate of the gain of the microactuator 5 based at least in part on the output 41 of the temperature sensor 19. Also, in various embodiments, the controller 40 is configured to control the level of the signal 44 provided to the microactuator 5 based at least in part on a controller gain, and the controller 40 is configured to adjust the controller gain based at least in part on the output 41 of the temperature sensor 19. In some embodiments, a gain of the microactuator 5 changes with a change in temperature, and the controller 40 is configured to compensate for a change in the gain of the microactuator 5.

In various embodiments, the controller 40, the microactuator 5 and the head 3 form at least part of a microactuator control loop, and a controller gain of the controller 40 in the microactuator control loop is variable. For example, a control loop may include the controller 40, the signal 44, the microactuator 5, the head 3, and the feedback signal 43. In some embodiments, the controller 40 is configured to adjust the controller gain of the controller 40 based at least in part on the output 41 of the temperature sensor 19. Also, in some embodiments, the controller 40 is configured to control the controller gain such that a total gain of the microactuator control loop for a particular type of operation is able to remain substantially constant when the microactuator 5 operates within an environmental or ambient temperature range of 0° C. to 65° C.

Figure 5:
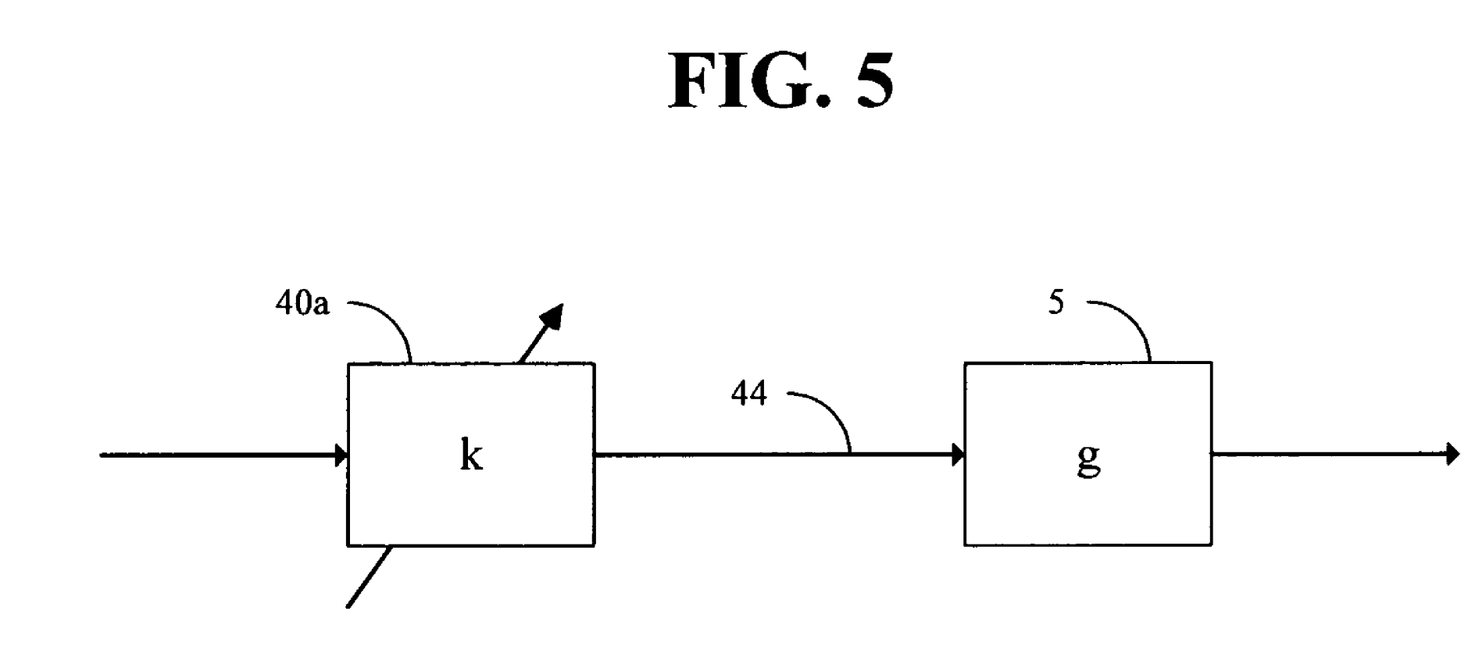
FIG. 5 illustrates a model of a portion of a microactuator control loop in accordance with an embodiment of the present invention.

FIG. 5 illustrates a model of a portion of a microactuator control loop in accordance with an embodiment of the present invention. The model of FIG. 5 includes a model of a microactuator control portion 40a of the controller 40 (refer to FIG. 4), and a model of the microactuator 5. In the model of FIG. 5, the microactuator control portion 40a has a variable gain k, and the microactuator 5 has a gain g. Also, in the example model of FIG. 5, the microactuator control portion 40a provides the signal 44 to control the microactuator 5. By collecting data from one or more disk drives, a relationship between changes in temperature and changes in the gain g of the microactuator 5 can be determined. In various embodiments, the method of FIG. 3 is employed to determine a relationship between temperature and the gain g of the microactuator 5.

With reference to FIGS. 4 and 5, in various embodiments, the controller 40 changes the gain k of the microactuator control portion 40a to compensate for a change in the gain g of the microactuator 5 due to a change in temperature. The gain g of the microactuator 5 represents a real material gain of material of the microactuator 5. The gain k represents a controller gain that may be, for example, variable in drive firmware.

In some embodiments, the controller 40 is configured to keep a product of k and g substantially constant by adjusting k when there is a change in temperature that leads to a change in g. A relationship between temperature and the microactuator gain g may be determined, for example, by the method of FIG. 3, and then the output 41 of the temperature sensor 19 may be used by the controller 40 along with the determined relationship to estimate a value of the microactuator gain g based on a current temperature. In various embodiments, the controller 40 may then adjust the gain k of the microactuator control portion 40a to compensate for the change in the gain g of the microactuator 5. In some embodiments, the gain k of the microactuator control portion 40a is periodically adjusted based on the output 41 of the temperature sensor 19. As a consequence, the signal 44 provided by the microactuator control portion 40a to the microactuator 5 may vary based at least in part on the output 41 of the temperature sensor 19.

Therefore, embodiments of the present invention allow for normalizing a microactuator control loop gain and, thus, allow for a very consistent loop response over a wide temperature range. With various embodiments of the present invention, piezoelectric gain inaccuracies due to temperature changes can be corrected accurately using temperature sensor measurements and determined relationships between temperature and microactuator gain, thus allowing for enhanced system performance and reliability.

Figure 6:
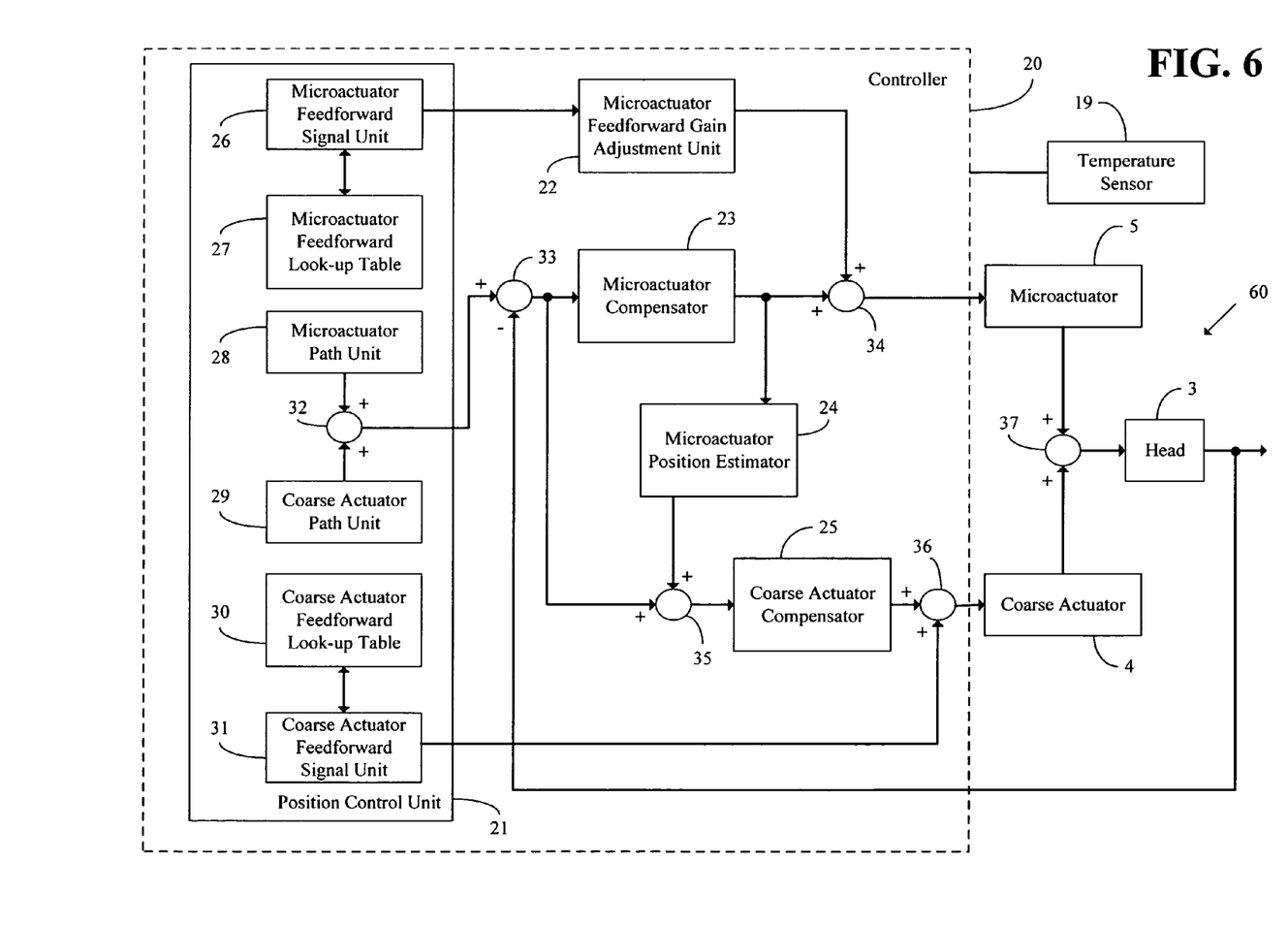
FIG. 6 illustrates a system in accordance with an embodiment of the present invention.

FIG. 6 illustrates a system 60 in accordance with an embodiment of the present invention. The system 60 includes a controller 20, the head 3, the microactuator 5, the coarse actuator 4, and the temperature sensor 19. The controller 20 receives an output of the temperature sensor 19, and the controller 20 allows for controlling the coarse actuator 4 and the microactuator 5. The controller 20 is part of the servo controller 10 (refer to FIG. 1), and in various embodiments, the controller 20 may be used for the controller 40 (refer to FIG. 4). In the following discussion, the controller 20 is described with reference to functional blocks and not discrete hardware elements. The functions may be implemented using one or more of hardware, software, and firmware. More than one function, or different parts of functions, may be combined in a given hardware, software, or firmware implementation.

The controller 20 comprises a position control unit 21, a microactuator feedforward gain adjustment unit 22, a microactuator compensator 23, a microactuator position estimator 24, and a coarse actuator compensator 25. The position control unit 21 comprises a microactuator feedforward signal unit 26, a microactuator feedforward look-up table 27, a microactuator path unit 28, a coarse actuator path unit 29, a coarse actuator feedforward look-up table 30, and a coarse actuator feedforward signal unit 31.

The microactuator path unit 28 is configured to provide a microactuator reference trajectory signal that specifies a reference trajectory for the microactuator 5. The reference trajectory for the microactuator 5 is a desired trajectory that the microactuator 5 should ideally follow to move the head 3 during a particular seek operation. Such a microactuator reference trajectory may specify target positions at which the head 3 should be positioned by the microactuator 5 with respect to a certain track at specified times during the particular seek operation. The microactuator reference trajectory may be specified, for example, by a function or by reference values stored in a table.

The coarse actuator path unit 29 is configured to provide a coarse actuator reference trajectory signal that specifies a reference trajectory for the coarse actuator 4. The reference trajectory for the coarse actuator 4 is a desired trajectory that the coarse actuator 4 should ideally follow to move the head 3 during the particular seek operation. Such a coarse actuator reference trajectory may specify target positions at which the head 3 should be positioned by the coarse actuator 4 with respect to the certain track at specified times during the particular seek operation. The coarse actuator reference trajectory may be specified, for example, by a function or by reference values stored in a table.

The microactuator reference trajectory signal provided by the microactuator path unit 28 may be added to the coarse actuator reference trajectory signal provided by the coarse actuator path unit 29 by a first summing node 32 to produce a single reference trajectory signal. The controller 20 may be configured to control both the coarse actuator 4 and the microactuator 5 based on the single reference trajectory signal provided by the first summing node 32. By controlling both the coarse actuator 4 and the microactuator 5 based on a single reference trajectory signal, the control of the seek operation can be simplified as compared to related art systems in which the coarse actuator reference trajectory signal and the microactuator reference trajectory signal are separately used to control the coarse actuator and the microactuator respectively. Of course, embodiments of the present invention are not limited to having a single reference trajectory signal, and some embodiments may allow for controlling the coarse actuator 4 and the microactuator 5 based on separate reference trajectory signals.

The microactuator feedforward signal unit 26 is configured to obtain a microactuator feedforward value from the microactuator feedforward look-up table 27, and to provide a microactuator feedforward control signal based on the obtained microactuator feedforward value. The microactuator feedforward signal unit 26 is configured, for example, to obtain each of the microactuator feedforward values in order from the microactuator feedforward look-up table 27 at specified time intervals during short seek operations, and to provide the microactuator feedforward control signal based on each obtained microactuator feedforward value. The microactuator feedforward look-up table 27 may comprise a memory that stores microactuator feedforward values in an order. Initial values for the microactuator feedforward values in the microactuator feedforward look-up table 27 may be precomputed and stored during a design process of the disk drive 1 (refer to FIG. 1).

The coarse actuator feedforward signal unit 31 is configured to obtain a coarse actuator feedforward value from the coarse actuator feedforward look-up table 30, and to provide a coarse actuator feedforward control signal based on the obtained coarse actuator feedforward value. The coarse actuator feedforward signal unit 31 is configured, for example, to obtain each of the coarse actuator feedforward values in order from the coarse actuator feedforward look-up table 30 at specified time intervals during short seek operations, and to provide the coarse actuator feedforward control signal based on each obtained coarse actuator feedforward value. The coarse actuator feedforward look-up table 30 may comprise a memory that stores coarse actuator feedforward values. Initial values for the coarse actuator feedforward values in the coarse actuator feedforward look-up table 30 may be precomputed and stored during a design process of the disk drive 1 (refer to FIG. 1).

With reference to FIGS. 1 and 6, during a seek operation, the head 3 reads data from servo sectors of the plurality of servo sectors 18 on the disk 2, and the head 3 provides a signal based on the read data to the r/w channel 11. The r/w channel 11 processes the signal from the head 3 when the head 3 reads data from the servo sectors, and the r/w channel 11 provides servo information to the servo controller 10 by processing the signal from the head 3. The servo controller 10 uses the servo information as a sensed position signal that indicates a position of the head 3 with respect to a track of the plurality of tracks 16. In the controller 20 of the servo controller 10, the sensed position signal is used as feedback. A second summing node 33 is configured to subtract the sensed position signal from the reference signal that is provided by the first summing node 32 in order to provide a position error signal (PES). Thus, the position error signal indicates a difference between a desired reference position of the head 3 specified by the reference signal and an actual position of the head 3 specified by the sensed position signal.

The microactuator compensator 23 receives the position error signal that is provided by the second summing node 33. The microactuator compensator 23 is configured to provide a microactuator compensation signal based on the position error signal that can be used to control the microactuator 5 to compensate for the position error. The microactuator position estimator 24 receives the microactuator compensation signal that is provided by the microactuator compensator 23. The microactuator position estimator 24 is configured to estimate a response of the microactuator 5 to the microactuator compensation signal, and the microactuator position estimator 24 provides an estimated microactuator position signal that estimates a movement of the head 3 by the microactuator 5 in response to the microactuator compensation signal. The position error signal and the estimated microactuator position signal are added by a third summing node 35 to provide an adjusted position error signal that takes into account an estimate of a response of the microactuator 5 to the position error signal.

The coarse actuator compensator 25 receives the adjusted position error signal that is provided by the third summing node 35. The coarse actuator compensator 25 is configured to provide a coarse actuator compensation signal based on the adjusted position error signal that can be used to control the coarse actuator 4 to compensate for the position error and for the movement of the microactuator 5 in response to the position error. Thus, the response of the coarse actuator compensator 25 takes into account an estimate of the response of the microactuator 5 to the position error signal.

The microactuator feedforward gain adjustment unit 22 receives the microactuator feedforward control signal that is provided by the microactuator feedforward signal unit 26. The microactuator feedforward gain adjustment unit 22 is configured to scale the microactuator feedforward control signal in accordance with a microactuator feedforward gain, and to provide a scaled microactuator feedforward control signal. The microactuator feedforward gain may be variable, and may be adjusted during operation of the disk drive 1 (refer to FIG. 1).

The scaled microactuator feedforward control signal provided by the microactuator feedforward gain adjustment unit 22 and the microactuator compensation signal provided by the microactuator compensator 23 are added by a fourth summing node 34 to provide a microactuator control signal. The microactuator 5 is configured to move the head 3 in accordance with the microactuator control signal. The coarse actuator feedforward control signal provided by the coarse actuator feedforward signal unit 31 and the coarse actuator compensation signal provided by the coarse actuator compensator 25 are added by a fifth summing node 36 to provide a coarse actuator control signal. The coarse actuator 4 is configured to move the head 3 in accordance with the coarse actuator control signal. The sixth summing node 37 illustrates that the movement of the head 3 is a combination of the movement of the head 3 due to the output of the microactuator 5 and the movement of the head 3 due to the output of the coarse actuator 4.

Embodiments of the present invention allow for improving a control of the microactuator 5 based on at least two techniques, which are: (i) adjusting a gain of the microactuator compensator based at least in part on an output of the temperature sensor 19; and (ii) adjusting the microactuator feedforward gain by which the microactuator feedforward gain adjustment unit 22 scales the microactuator feedforward control signal based at least in part on an output of the temperature sensor 19. Some embodiments may use only one of the techniques, while other embodiments may use both techniques together to improve the control of the microactuator 5.

Figure 7:
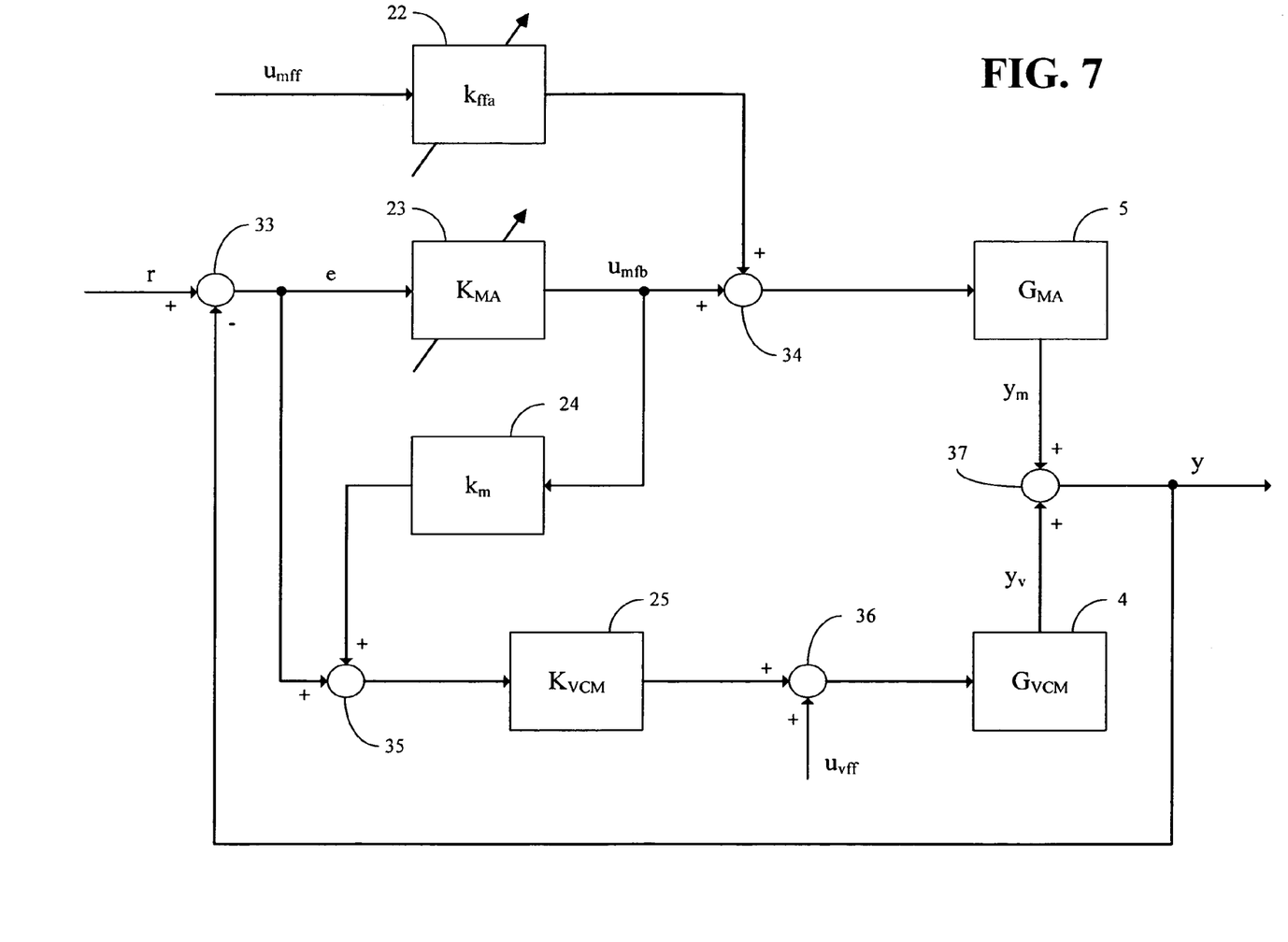
FIG. 7 illustrates a block diagram of a model of a dual stage actuator control design in accordance with an embodiment of the present invention.

FIG. 7 illustrates a block diagram of a model of a dual stage actuator control design in accordance with an embodiment of the present invention. The model of FIG. 7 is a model of the controller 20, the coarse actuator 4, and the microactuator 5 of FIG. 6, and the model elements in FIG. 7 are model elements of the like numbered elements in FIG. 6.

In the model of FIG. 7, the coarse actuator 4 has a transfer function $G_{VCM}$, the coarse actuator compensator 25 has a transfer function $K_{VCM}$, the microactuator 5 has a transfer function $G_{MA}$, the microactuator compensator 23 has a transfer function $K_{MA}$, the microactuator position estimator 24 has a gain $k_m$, and the microactuator feedforward gain adjustment unit 22 has a variable gain $k_{ffa}$. Also, the reference trajectory signal input to the second summing node 33 is denoted as r, the position error signal provided by the second summing node 33 is denoted as e, the microactuator compensation signal provided by the microactuator compensator 23 is denoted as $u_{mfb}$, the microactuator feedforward control signal input to the microactuator feedforward gain adjustment unit 22 is denoted $u_{mff}$, the coarse actuator feedforward control signal input to the fifth summing node 36 is denoted as $u_{vff}$, the output of the microactuator 5 is denoted as $y_m$, the output of the coarse actuator 4 is denoted as $y_v$, and the sensed position signal of the head 3 that is input to the second summing node 33 is denoted as y.

By denoting the microactuator compensation signal as $u_{mfb}$, it is recognized that the microactuator compensation signal is a feedback signal for the microactuator 5. Also, by denoting the microactuator feedforward control signal as $u_{mff}$, it is recognized that the microactuator feedforward control signal is a feedforward signal for the microactuator 5.

With reference to FIGS. 6 and 7, in various embodiments, the controller 20 is configured to adjust a gain of the microactuator compensator 23 to compensate for changes in a gain of the microactuator 5 due to changes in temperature. In some embodiments, a relationship between changes in temperature and changes in the gain of the microactuator 5 is determined. For example, the method of FIG. 3 may be used to determine a relationship between temperature and a gain of the microactuator 5. Then, in various embodiments, the controller 20 is configured to adjust an estimate of a gain of the microactuator 5 based at least in part on the output of the temperature sensor 19 to determine an adjusted gain value. In some embodiments, the controller 20 adjusts the gain of the microactuator compensator 23 based on the adjusted gain value determined for the gain of the microactuator 5 so as to compensate for a change in the gain of the microactuator 5 due to a change in temperature.

In various embodiments, the controller 20 is configured to adjust the gain $k_{ffa}$ of the microactuator feedforward gain adjustment unit 22 to compensate for changes in a gain of the microactuator 5 due to changes in temperature. In some embodiments, a relationship between changes in temperature and changes in the gain of the microactuator 5 is determined. For example, the method of FIG. 3 may be used to determine a relationship between temperature and a gain of the microactuator 5. Then, in various embodiments, the controller 20 is configured to adjust an estimate of a gain of the microactuator 5 based at least in part on the output of the temperature sensor 19 to determine an adjusted gain value. In some embodiments, the controller 20 adjusts the gain $k_{ffa}$ of the microactuator feedforward gain adjustment unit 22 based on the adjusted gain value determined for the gain of the microactuator 5 so as to compensate for a change in the gain of the microactuator 5 due to a change in temperature.

In some embodiments, the controller 20 adjusts the gain of the microactuator compensator 23 and the gain $k_{ffa}$ of the microactuator feedforward gain adjustment unit 22 based at least in part on the output of the temperature sensor 19, so as to compensate for changes in a gain of the microactuator 5 due to changes in temperature. In various embodiments, the gain $k_m$ of the microactuator position estimator 24 is variable, and the controller 20 adjusts the gain $k_m$ of the microactuator position estimator 24 based at least in part on the output of the temperature sensor 19.

Therefore, embodiments of the present invention allow for normalizing a system loop gain using temperature sensor measurements, such that a system has a consistent loop response even when there is a change in a gain of a micro actuator caused by a change in temperature. As a consequence, embodiments of the present invention allow for a tight distribution of a system loop response over a wide temperature range.

Figure 8:
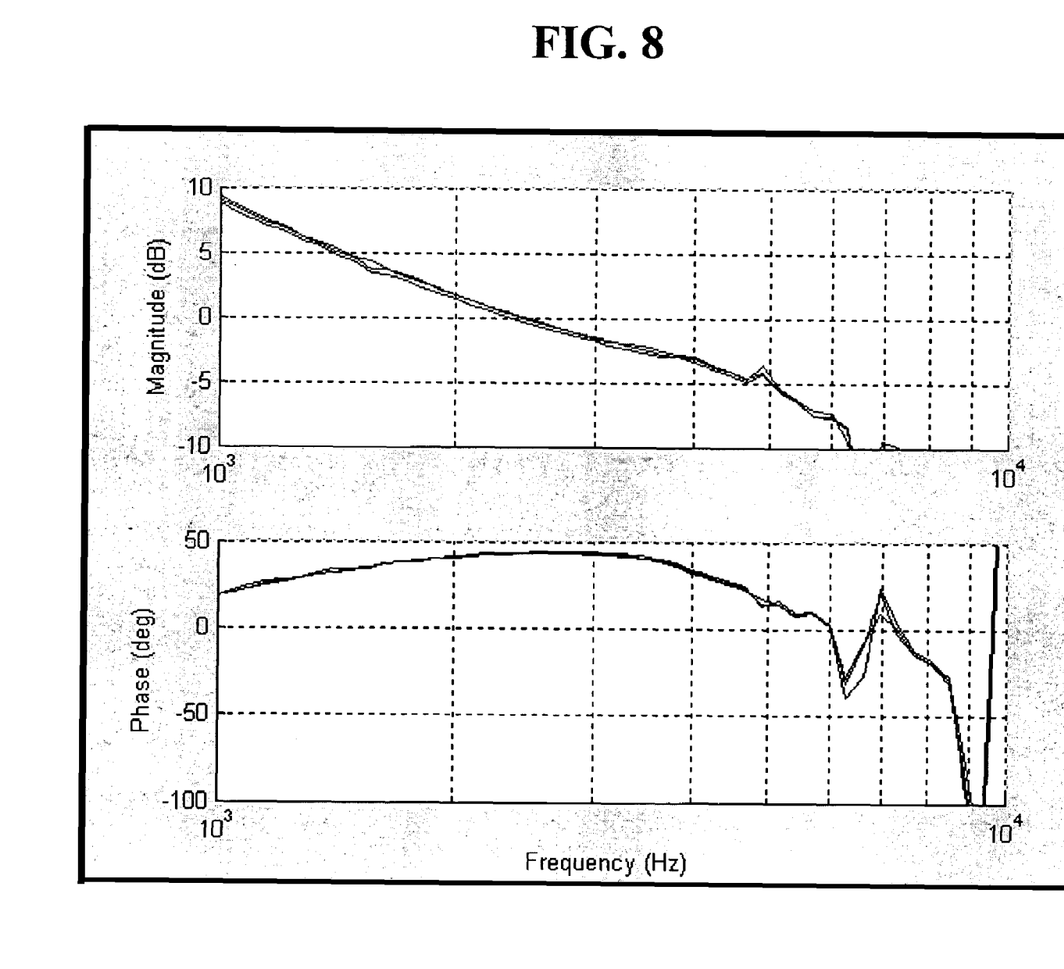
FIG. 8 illustrates a magnitude versus frequency chart and a phase versus frequency chart of an example system loop response in accordance with an embodiment of the present invention.

FIG. 8 illustrates a magnitude versus frequency chart and a phase versus frequency chart of an example system loop response in accordance with an embodiment of the present invention. In the charts of FIG. 8, the magnitude and phase are each plotted for a system loop response at three temperatures, namely, a low temperature, a medium temperature, and a high temperature. As is illustrated in the charts of FIG. 8, all three lines are really close to each other and, thus, there is almost no difference in the system loop response at the three different temperatures. Thus, by normalizing a system loop gain using temperature sensor measurements to compensate for a change in a gain of a microactuator caused by a change in temperature, embodiments of the present invention allow for attaining a tight distribution of a system loop response over a wide temperature range.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. A circuit comprising:
 a controller that responds to an input signal from a head reading data from a disk to generate an output microactuator control signal to a microactuator that moves the head, wherein the controller estimates a gain of the microactuator in response to a temperature signal from a temperature sensor and adjusts a gain between the input signal and the output microactuator control signal in response to the estimated gain of the microactuator.

2. The circuit of claim 1, wherein the controller comprises a microactuator compensator that responds to an input position error signal from the head reading servo data to generate the output microactuator control signal and that estimates a gain of the microactuator in response to the temperature signal and adjusts the gain between the input position error signal and the output microactuator control signal in response to the estimated gain of the microactuator.

3. The circuit of claim 1, wherein the controller periodically estimates the gain of the microactuator in response to the present temperature signal from the temperature sensor and adjusts the gain between the input signal and the output microactuator control signal in response to each of the periodically estimated gains of the microactuator.

4. The circuit of claim 1, wherein:
 the controller comprises a microactuator compensator and a microactuator feedforward signal unit;
 the microactuator compensator responds to the input signal from the head to generate the output microactuator control signal, estimates the gain of the microactuator in response to the temperature signal, and adjusts the gain between the input signal and the output microactuator control signal in response to the estimated gain of the microactuator; and
 the microactuator feedforward signal unit generates a microactuator feedforward control signal from a series of predefined microactuator feedforward control values, and scales the microactuator feedforward control signal in response to the temperature signal to generate a scaled microactuator feedforward control signal which is combined with the output microactuator control signal to control the microactuator.

5. The circuit of claim 4, wherein:
 the controller further comprises a microactuator position estimator and a coarse actuator compensator, the microactuator position estimator generates an estimate of microactuator position in response to the temperature signal and the output microactuator control signal, and the coarse actuator compensator controls a coarse actuator that moves the head in response to the estimated microactuator position from the microactuator position estimator and in response to the input signal from the head.

6. The circuit of claim 4, wherein:
 the controller further comprises a memory storing a microactuator feedforward look-up table with an ordered series of the predefined microactuator feedforward control values; and
 the microactuator feedforward signal unit sequentially retrieves the predefined microactuator feedforward control values from the microactuator feedforward look-up table at a specified time interval during the seek operation to generate the microactuator feedforward control signal.

7. The circuit of claim 1, wherein:
the controller comprises a microactuator compensator, a microactuator position estimator, and a coarse actuator compensator;
the microactuator compensator responds to the input signal from the head to generate the output microactuator control signal to the microactuator to move the head, estimates the gain of the microactuator in response to the temperature signal, and adjusts the gain between the input signal and the output microactuator control signal in response to the estimated gain of the microactuator;
the microactuator position estimator generates an estimate of microactuator position in response to the temperature signal and the output microactuator control signal; and
the coarse actuator compensator controls a coarse actuator that moves the head in response to the estimated microactuator position from the microactuator position estimator and in response to the input signal from the head.

8. The circuit of claim 1, wherein the controller estimates the gain of a piezoelectric device type microactuator in response to the temperature signal and adjusts the gain between the input signal and the output microactuator control signal in response to the estimated gain of the micro actuator.

9. A method comprising:
generating an microactuator control signal to a microactuator that moves a head in response to an input signal from the head reading data from a disk;
estimating a gain of the microactuator in response to a temperature signal from a temperature sensor; and
adjusting a gain between the input signal and the generated microactuator control signal in response to the estimated gain of the microactuator.

10. The method of claim 9, further comprising:
generating the microactuator control signal in response to an input position error signal from the head reading servo data from the disk; and
adjusting the gain between the input position error signal and the generated microactuator control signal in response to the estimated gain of the microactuator.

11. The method of claim 9, further comprising:
periodically estimating the gain of the microactuator in response to the present temperature signal from the temperature sensor and adjusting the gain between the input position error signal and the generated microactuator control signal in response to each of the periodically estimated gains of the microactuator.

12. The method of claim 9, further comprising:
generating a microactuator feedforward control signal from a series of predefined microactuator feedforward control values during a seek operation;
scaling the microactuator feedforward control signal in response to the temperature signal to generate a scaled microactuator feedforward control signal; and
controlling the microactuator in response to a combination of the scaled microactuator feedforward control signal and the microactuator control signal.

13. The method of claim 12, further comprising:
providing a microactuator feedforward look-up table with an ordered series of the predefined microactuator feedforward control values; and
sequencing through the series of predefined microactuator feedforward control values in the microactuator feedforward look-up table at a specified time interval during the seek operation to generate the microactuator feedforward control signal.

14. The method of claim 9, further comprising:
estimating the gain of a piezoelectric device type microactuator in response to the temperature signal; and
adjusting the gain between the input signal and the output microactuator control signal in response to the estimated gain of the microactuator.

15. The method of claim 9, further comprising:
generating an estimate of microactuator position in response to the temperature signal and the generated microactuator control signal; and
controlling a coarse actuator to move the head in response to the estimated microactuator position and in response to the input signal from the head.

16. The method of claim 9, further comprising:
sampling the gain of the microactuator over a plurality of different ambient temperatures indicated by the temperature signal from the temperature sensor to generate a plurality of sampled gain values and associated temperature values; and
generating a polynomial equation that approximates a relationship between the sampled gain values and associated temperature values,
wherein estimating the gain of a piezoelectric device type microactuator comprises estimating the gain from the polynomial equation responsive to a present ambient temperature indicated by the temperature signal.

17. the method of claim 16, wherein sampling the gain of the microactuator comprises:
sampling the gain a plurality of times at each of the ambient temperatures indicated by the temperature signal; and
averaging the sampled gain values at each of the ambient temperatures to generate an average gain value at each of the ambient temperatures, wherein the generated polynomial approximates a relationship between the average gain values and associated temperature values.

18. The method of claim 9, further comprising:
sampling gain of the microactuator over a plurality of different ambient temperatures indicated by the temperature signal from the temperature sensor to generate a table of comprising a plurality of sampled gain values and associated temperature values,
wherein estimating the gain of a piezoelectric device type microactuator comprises interpolating among the sampled gain values and associated temperature values in the table responsive to a present ambient temperature indicated by the temperature signal to estimate the gain.

* * * * *